United States Patent [19]

Schatzberger et al.

[11] Patent Number: 4,858,166
[45] Date of Patent: Aug. 15, 1989

[54] METHOD AND STRUCTURE FOR PERFORMING FLOATING POINT COMPARISON

[75] Inventors: Yeshayahu Schatzberger, Haifa, Israel; Yeshayahu Mor; Leonardo Sandman, both of Cupertino, Calif.

[73] Assignee: Performance Semiconductor Corporation, Sunnyvale, Calif.

[21] Appl. No.: 909,526

[22] Filed: Sep. 19, 1986

[51] Int. Cl.$^4$ ............................................. G06F 7/38
[52] U.S. Cl. .................................................. 364/748
[58] Field of Search ............................... 364/748, 715

[56] References Cited

U.S. PATENT DOCUMENTS

| | | | |
|---|---|---|---|
| 3,814,925 | 6/1974 | Spannagel | 364/748 X |
| 4,229,801 | 10/1980 | Whipple | 364/748 |
| 4,592,006 | 5/1986 | Hagiwara et al. | 364/748 |
| 4,644,490 | 2/1987 | Kobayashi et al. | 364/748 |
| 4,719,589 | 1/1988 | Tanaka | 364/748 |

OTHER PUBLICATIONS

Levine, "Fraction Addition or Subtraction or Comparison Overlap with Characteristic Comparison", IBM Tech. Discl. Bull., vol. 15, No. 7, Dec. 1972, pp. 2162.
Hayes, "Computer Architecture and Organization", McGraw-Hill Book Company, 1978, pp. 202-209.

Primary Examiner—Gary V. Harkcom
Assistant Examiner—Tan V. Mai
Attorney, Agent, or Firm—Skjerven, Morrill, MacPherson, Franklin & Friel

[57] ABSTRACT

Comparison of two floating point numbers is performed using a unique algorithm, which in one embodiment is implemented very efficiently in hardware, resulting in a very significant improvement in the floating point comparison execution time. In order to perform a floating point comparison, the exponents of the two numbers to be compared are subtracted. In many cases, the exponents are not equal, and simply determining which exponent is larger, combined with the signs of the mantissas of each of the floating point numbers being compared, is sufficient to determine which of the two floating point numbers being compared is larger. Alternatively, if the exponents of the two floating point numbers being compared are equal, the mantissas may be subtracted without need for shifting mantissas in order to equalize the exponents. In this manner, the floating point comparison operation is greatly simplified and the time consuming multiple shift operation is avoided, thereby vastly reducing the amount of time required to perform the floating point comparison, and thereby increasing the overall speed of operation of the microprocessor.

1 Claim, 2 Drawing Sheets

METHOD AND STRUCTURE FOR PERFORMING FLOATING POINT COMPARISON

BACKGROUND

This invention relates to electronic circuitry, and in particular to a method and structure for performing a floating point comparison, which is particularly useful for example, in a microprocessor or other digital computational circuits.

FIG. 1 is a block diagram of a typical prior art arithmetic circuit which is used for, among other things, performing floating point comparisons. As known in the art, a floating point comparison is the comparison between two floating point numbers in order to determine which, if either, is larger.

Referring to FIG. 1, the first floating point word to be compared is received on "A bus" 11a, and a second floating point word to be compared is received on "B bus" 11b. As known in the art, a typical floating point number contains 32 bits: 24 bits defining the mantissa, and 8 bits defining the exponent. Thus, the A bus and the B bus must each receive two 16 bit words in order to define the two floating point numbers to be compared. For certain operations, such as a floating point comparison of double precision numbers, 48 bits are required to define each double precision floating point number (40 bits to define a mantissa and 8 bits to define the exponent). In this event, three 16 bit words are required to fully define each double precision floating point number.

FIG. 2 shows a typical bit assignment of two 16 bit words for defining a floating point number. Since two 16 bit words are required to define each floating point number, the first word received on A bus 11a (FIG. 1) is denoted "RA" and the first 16 bit word received on B bus 11b (FIG. 1) is referred to as "RB". Similarly, the second 16 bit word received on A bus 11a is called "RA+1" and the second 16 bit word received on B bus 11b is called "RB+1". As shown in FIG. 2, RA and RB each define the 16 most significant mantissa bits, M0 through M15. The words RA+1 and RB+1 define in their 8 most significant bits, the 8 least significant bits of the mantissa, M16 through M23. The 8 least significant bits of words RA+1 and RB+1 define the 8 bits of the exponent, E0 through E7. In this manner, by receiving two consecutive words RA; RA+1 and RB; RB+1 on A bus 11a and B bus 11b, respectively, one 32 bit floating point number is received on each of the A bus and B bus for comparison.

However, since the structure of FIG. 1 contains only 16 bits wide paths, each half of the floating point numbers to be compared must be treated in separate steps, as is described more fully below.

Referring again to FIG. 1, A latch 12a and B latch 12b serve to latch the data received on A bus 11a and B bus 11b, respectively. A prelogic 13a and B prelogic 13b serve to preprocess the data in A latch 12a and B latch 12b, respectively, prior to application to arithmetic logic unit (ALU) 14. For example, A prelogic 13a and B prelogic 13b serve to mask out any desired bits, as is sometimes required prior to applying data to ALU 14 for certain operations. The data is thus applied to ALU 14, which performs a floating point subtraction operation in order to determine which is larger, the floating point number received on A bus 11a or the floating point number received on B bus 11b. The output of ALU 14 is applied to shifter 15 which serves to shift the result from ALU 14, if necessary for further operations.

In the prior art, in order to perform a floating point comparison, a floating point subtraction is performed. As is well known in the prior art, in order to perform a floating point subtraction, the two numbers must be aligned to insure that both numbers have the same exponent. This is the same as addition or subtraction of two numbers expressed in scientific notation, which can be added when both numbers are expressed with the same power of 10. Just like in the addition or subtraction of two numbers expressed in scientific notation, if the floating point numbers received on A bus 11a and B bus 11b do not have exponents which are identical, the numbers must be adjusted so that the exponents become identical. Once this is accomplished, the mantissa may simply be added or subtracted, while retaining the common exponents.

In the prior art, the algorithm of Table 1 is used to perform comparisons of two 32 bit floating point numbers, A and B.

TABLE 1

| | |
|---|---|
| Step 1 | Subtract the exponents as represented by the 8 least significant bits of the 2 floating point numbers to be compared, and load the result in a temporary register:<br>RTemp = (RA+1) [8:15] − (RB+1) [8:15] |
| Step 2 | Check the exponent flags to determine which number (A or B) has the larger exponent. If the two numbers A and B have the same exponent, the result stored in RTemp will be 0. If the floating point number A has a larger exponent than the floating point number B, then the result stored in RTemp will be positive. If the floating point number B has a larger exponent than the floating point number A, the result stored in RTemp will be negative. |
| Step 3 | Decide to adjust either floating point number A or floating point number B to cause floating point numbers A and B to have the same exponent in order that a floating point subtraction may be performed. |
| Step 4 | Perform a right shift of the 8 least significant bits of the mantissa of the smaller of floating point numbers RA+1 [0:7] and RB+1 [0:7]. |
| Step 5 | Perform an arithmetic right shift of the 16 most significant bits of the mantissa of the smaller of floating point numbers RA or RB. |
| Step 6 | Decrement the number stored in RTemp which defines the difference between the exponents of floating point numbers A and B. This number stored in RTemp thus defines the number of right shifts of the mantissa of the smaller of floating point numbers A or B required in order to cause both floating point numbers to have a common exponent. |
| Step 7 | Determine if the result stored in RTemp is equal to 0. If so, the exponents of the floating point numbers A and B have been equalized and the mantissas may be subtracted. If not, repeat steps 4 through 7. |
| Step 8 | Execute the subtraction to determine which, if either, of floating point numbers A and B is larger. |

Since the mantissas of floating point numbers are 24 bits wide, a maximum of 23 shifts may be required to insure that the exponents of floating point numbers A and B are equal. Naturally, this is the worse case example, and in many instances a fewer number of shifts will be required. However, it is common that 10 or 15 right shifts are required in order to cause the A and B floating point numbers to have common exponents during the floating point subtraction operation. Furthermore, as seen above, performing the right shift of the least significant bits of the mantissa (step 4 above) and the right shift of the most significant bits of the mantissa (step 5 above) requires two separate micro instruction cycles. Thus, for each floating point comparison made by prior art techniques, a significant amount of instruction time is required, thereby causing each floating point comparison operation to severely impact the throughput a microprocessor or other structure employing the floating point comparison operation.

SUMMARY

In accordance with the teachings of this invention, comparison of two floating point numbers is approached with far greater efficiency in order to minimize the time required for the microprocessor to perform the comparison. Rather than performing a straight floating point subtraction operation, as was done in the prior art, a floating point comparison in accordance with the teachings of the present invention is performed using a unique algorithm, which in one embodiment is implemented very efficiently in hardware, resulting in a very significant improvement in the floating point comparison execution time.

In accordance with the teachings of this invention, in order to perform a floating point comparison, the exponents of the two numbers to be compared are subtracted. In many cases, the exponents are not equal, and simply determining which exponent is larger, combined with the signs of the mantissas of each of the floating point numbers being compared, is sufficient to determine which of the two floating point numbers being compared is larger. Alternatively, if the exponents of the two floating point numbers being compared are equal, the mantissas may be subtracted without need for shifting mantissas in order to equalize the exponents. In this manner, the floating point comparison operation is greatly simplified and the time consuming multiple shift operation is avoided, thereby vastly reducing the amount of time required to perform the floating point comparison, and thereby increasing the overall speed of operation of the microprocessor.

DETAILED DESCRIPTION

Figure 1:
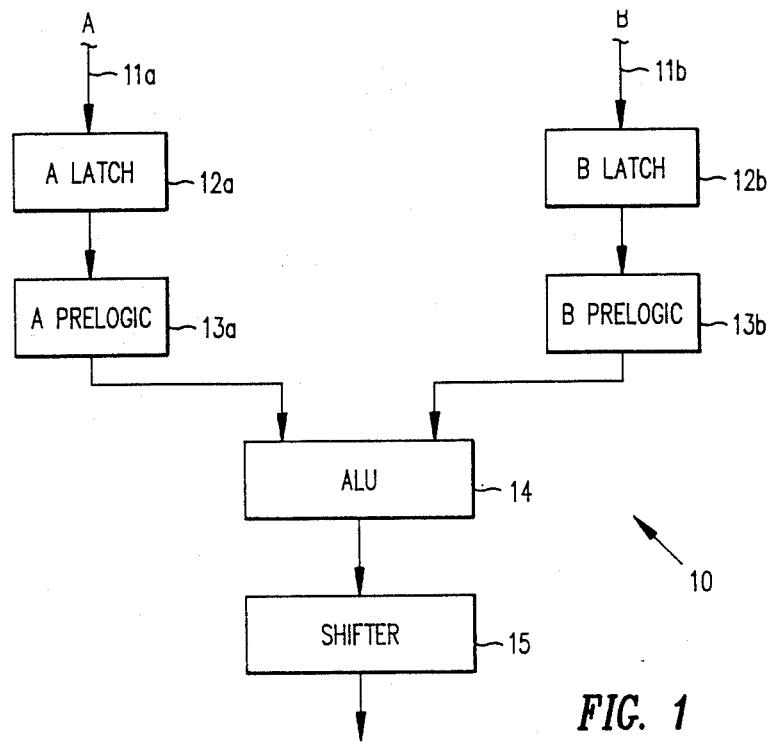
FIG. 1 is a block diagram of a portion of a typical prior art microprocessor used for performing floating point comparisons.
Figure 2:
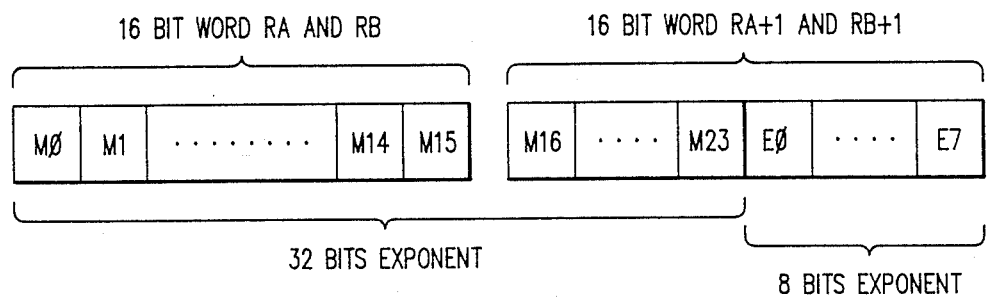
FIG. 2 is a description of the bit pattern used to allow two 16 bit words to define a single 32 bit floating point number.

In accordance with the teachings of this invention, comparison of two floating point numbers performed with greater speed than in the prior art. Rather than simply performing a floating point subtraction for each floating point comparison required, as was done in the prior art, in accordance with the teachings of the present invention specific data regarding the two floating point numbers to be compared are carefully examined in order to determine how best to perform the comparison.

In accordance with the teachings of this invention, if the exponents of the two floating point numbers to be compared are not equal, information regarding which exponent is larger, and the signs of both floating point numbers, is used in order to quickly and efficiently determine which of the two floating point numbers is larger. For example, if the exponent of floating point number A is greater than the exponent of floating point number B, then the floating point number A is greater than the floating point number B, unless the sign of floating point number A is negative and the sign of floating point number B is positive. Similarly, if the exponent of floating point number B is greater than the exponent of floating point number A, floating point number B is greater than floating point number A, unless the sign of floating point number B is negative and the sign of floating point number A is positive.

However, in the event that the exponent of floating point number A is the same as the exponent of floating point number B and their signs are not equal, the larger number is determined to be the floating point number A or B having the positive sign. In the sole event that the exponents of floating point numbers A and B are equal, and the signs of floating point numbers A and B are equal, subtraction of the mantissas is required in order to perform the comparison. However, this subtraction is required only when the exponents of the two floating point numbers A and B are equal, and no time consuming shifting of the mantissas is required in order to cause the two floating point numbers being subtracted to have the same exponents. By recognizing these facts, in accordance with the teachings of this invention, a method and structure is provided for performing floating point comparisons which does not necessarily require the time consuming task of performing a floating point subtraction.

Table 2 indicates the steps of one algorithm for performing floating point comparisons in accordance with the teachings of this invention.

TABLE 2

| | |
|---|---|
| Step 1 | Prepare two 32-bit floating point numbers for subtraction. Note: If a 32-bit machine is used, this occurs naturally; if a 16-bit machine is used, two steps are required. |
| Step 2 | Subtract the exponents as represented by the 8 least significant bits of the 2 floating point numbers to be compared, and store the result in RTemp (RA+1) [8:15] − (RB+1) [8:15]. |
| Step 3 | If the result stored in RTemp is not equal to 0, then compare the signs of the mantissas and the result of the comparison of the exponents stored in RTemp to determine which floating point number A or B is greater. If the result stored in RTemp is 0, the exponents of floating point numbers A and B are equal, determine if the signs are equal. If so, a floating point subtraction is performed to determine the comparison. If the signs are not equal, the larger number is the positive number |

As can be seen by comparing the algorithm of one embodiment of this invention shown in Table 2 with the prior art algorithm shown in Table 1, the time consuming and repetitive steps of the prior art which serve to adjust the exponents of the two numbers being compared is NOT required in accordance with this invention. Thus, as a worse case example, the technique of this invention allows a floating point comparison to save up to 46 machine cycles in a typical 16 bit machine, based on two cycles required for a 16 bit machine to perform one shift step of the full 24 bit floating point mantissa, assuming a need for 23 shift steps. Naturally, for numbers which do not require 23 shifts for the adjustment for their exponents, this comparison will be slightly different, although the principles are the same. On an average, floating point comparisons require 5 shifts. Thus, floating point comparisons performed in accordance with the teachings of this invention are approximately six times faster than in the prior art. Thus, utilizing the teachings of this invention, a significant improvement of performance is obtained as compared with the prior art.

Figure 3:
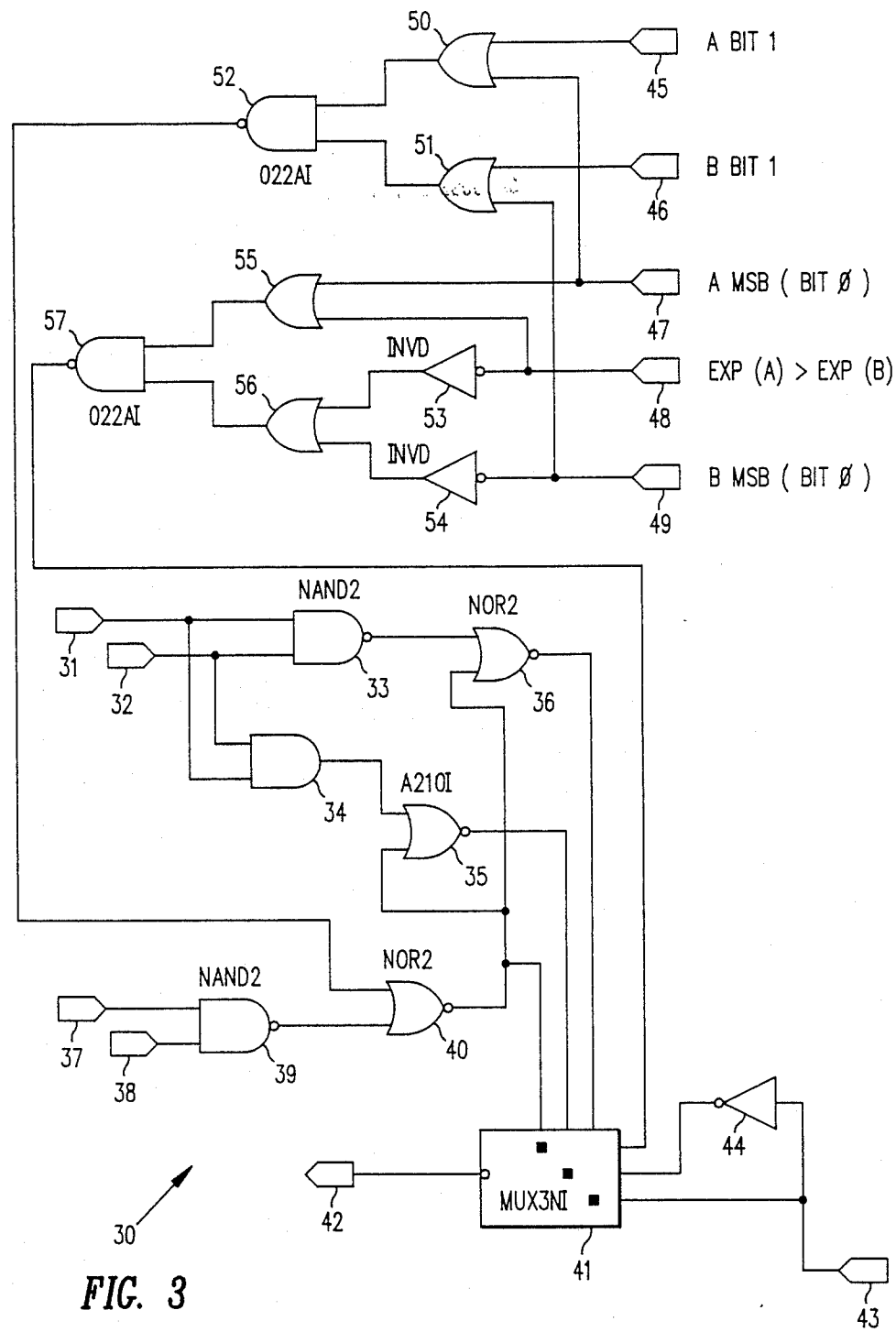
FIG. 3 is a schematic diagram of one embodiment of a logic circuit suitable for use in performing comparisons of two floating point numbers in accordance with the teachings of this invention.

In one embodiment of this invention, specific hardware is utilized in order to perform much of the floating point comparison operation, in order to minimize the need for the microprocessor to perform these functions in microcode, thereby greatly speeding the floating point comparison operation. FIG. 3 depicts one embodiment of such a hardware circuit. As will be appreciated by those skilled in the art, the circuit of FIG. 3 is easily implemented as a portion of a microprocessor integrated circuit, and requires very little area on the integrated circuit chip. Thus, this hardware may be added at very little cost, and yet greatly enhance the speed and efficiency of floating point comparison operations.

Referring to FIG. 3, one circuit for performing much of the floating point comparison operation is shown. Multiplexer 41 selects one of three input signals as provided either from input terminal 43 which provides the sign bit of the result of the subtraction of the mantissas of the two floating point numbers being compared, the output signal from inverter 44 which is the inverse of the signal received on the input lead 43, and the output signal from AND gate 57 which, as more fully described below, provides a signal based upon the most significant (sign) bits of the two floating point numbers being compared (hereinafter referred to as numbers A and B), and their exponents. The output signal from multiplexer 41 is called the $\overline{\text{POSITIVE FLAG}}$ signal, which indicates if the result of the comparison of floating point numbers A and B is positive i.e., if floating point number A is greater than floating point number B). Provided elsewhere and not shown in FIG. 3 is a zero detection circuit, which indicates if the result of the subtraction of the two floating point numbers A and B is zero. If so, this information indicates that the floating point numbers A and B are equal. If the two numbers are not equal, and the $\overline{\text{POSITIVE FLAG}}$ signal is a logical 1, then floating point number B is greater than floating point number A.

In operation, when comparison of two floating point numbers is to be performed, the numbers are immediately subtracted (i.e., both their mantissas and their exponents). If the result of the subtraction of their exponents is zero, it means that the exponents were equal, and the mantissas must be subtracted in order to perform a comparison. However, this has already been performed, and the result of the subtraction of the mantissas is used to determine whether floating point number A is greater than floating point number B. Alternatively, if the result of the subtraction of the exponents is not zero, it means that the exponents of floating point numbers A and B were not equal, and the subtraction of the mantissas is ignored. In this event, the special hardware of FIG. 3 is used to provide the $\overline{\text{POSITIVE FLAG}}$ output bit.

When a floating point comparison is being performed, the FLOATING POINT COMPARISON signal applied to input lead 37 is set to a logical one. Similarly, the FIXED POINT COMPARE signal provided on input lead 31 is also a logical one at this time, in order to make the circuit FIG. 3 operate properly. As a result of the aforementioned subtraction of the exponents of the two floating point numbers being compared, the $\overline{\text{EQUAL EXPONENTS}}$ signal is a logical one if the result of the subtraction of the exponents is not zero, indicating that the special hardware of FIG. 3 is to provide an output signal based upon the signs of the floating point numbers and the difference in their exponents, as provided by NAND gate 57. If the result of the subtraction of the exponents is not zero, the $\overline{\text{EQUAL EXPONENTS}}$ signal is a logical zero, thereby providing a logical one output signal from NAND gate 39, which in turn causes NOR gate 40 to provide a logical zero output signal, thereby causing multiplexer 41 to deselect the output signal from NAND gate 57.

If the result of the subtraction of the exponents is not zero, the $\overline{\text{EQUAL EXPONENTS}}$ signal applied to input lead 38 is a logical one. This, combined with logical one FLOATING POINT COMPARISON signal, provides a logical zero output signal from NAND gate 39, which in turn causes NOR gate 40 to provide a logical one output signal, thereby causing multiplexer 41 to select the output signal from NAND gate 57. There is an exception to this, when the output signal from NAND gate 52 is a logical one, which will be described in more detail later. With the output signal from NAND gate 57 selected, the $\overline{\text{POSITIVE FLAG}}$ signal is created as the result of the most significant bits of the A and B floating point numbers, and the result of the subtraction of the exponents of floating point number A and floating point number B. This is accomplished according to Table 3:

TABLE 3

| $\overline{\text{Exp(A) > Exp(B)}}$ | AMSB | | BMSB | $\overline{\text{POS. FLAG}}$ |
|---|---|---|---|---|
| 0 | Select AMSB | 0 | 0 | 1 |
| 0 | Select AMSB | 0 | 1 | 1 |
| 0 | Select AMSB | 1 | 0 | 0 |
| 0 | Select AMSB | 1 | 1 | 0 |
| 1 | Select BMSB | 0 | 0 | 1 |
| 1 | Select BMSB | 0 | 1 | 0 |
| 1 | Select BMSB | 1 | 0 | 1 |
| 1 | Select BMSB | 1 | 1 | 0 |

In other words, as is shown in Table 3, if the exponent of floating point number A is greater than the exponent of floating point number B, the AMSB signal (the most significant bit of floating point number A) is selected by NOR gates 55 and 56, and the AMSB is inverted by NAND gate 57 to provide the $\overline{\text{POSITIVE FLAG}}$ output signal. Conversely, if the exponent of floating point number B is greater than the exponent of floating point number A, NOR gates 55 and 56 select the most significant bit of floating point number B to be inverted by NAND gate 57 in order to provide the $\overline{\text{POSITIVE FLAG}}$ output signal from multiplexer 41.

However, as previously mentioned, there is one exception to this operation. If one of the floating point numbers being compared is equal to zero, and the other floating point number is a positive number having a negative exponent, the circuit thus far described will provide an erroneous $\overline{\text{POSITIVE FLAG}}$ output signal. For this reason, NOR gate 50 and NOR gate 51 receive as input signals the two next to the most significant bits of floating point word A and floating point word B, respectively. Since the floating point numbers being compared are normalized, the only time that the next to the most significant bit and the most significant bit of a floating point number are equal to zero is when the number itself is equal to zero. Thus, NOR gate 50 and NOR gate 51 provide a logical zero output signal when the A word or B word, respectively, are equal to zero. In the event that either one or both of floating point word A or B are equal to zero, NAND gate 52 provides a logical one output signal, which causes NOR gate 40 to have a logical zero output signal, thereby causing multiplexer 41 to deselect the output signal from NAND gate 57. Thus, the error which would have occurred by using the output signal from NAND gate 57 to provide the $\overline{\text{POSITIVE FLAG}}$ output signal when either one or both of floating point words A and B are equal to zero, is avoided.

In this event, the output signal from input lead 43 or inverter 44 is selected by multiplexer 41 to provide the $\overline{\text{POSITIVE FLAG}}$ output signal. As previously described, when performing a floating point comparison operation, the FIXED POINT COMPARISON signal applied to lead 31 is a logical one. The FLAG OVERFLOW input signal applied to input lead 32 is provided by additional circuitry, not shown, well known to those of ordinary skill in the art, which indicates if there has been an overflow condition during the subtraction of the mantissas of the A and B floating point words, which has previously been performed as described above. If no overflow has occurred, the FLAG OVERFLOW input signal is a logical zero, and NAND gate 33 provides a logical one output signal, which causes NOR gate 36 to have a logical zero output signal, which causes multiplexer 41 to deselect the input lead 43, carrying the sign bit of the result of the subtraction of floating point word A and B mantissas. Simultaneously, AND gate 34 provides a logical zero output signal which, combined with the logical zero output signal from NOR gate 40, as previously described, causes NOR gate 35 to provide a logical one output signal, causing multiplexer 41 to select the output signal from inverter 44 for providing the $\overline{\text{POSITIVE FLAG}}$ output signal. Thus, with no overflow caused by the subtraction of the mantissas of floating point words A and B, the inverse of the sign bit resulting from the subtraction of the mantissas of floating point words A and B is used to provide the $\overline{\text{POSITIVE FLAG}}$ output signal when either floating point word A or B, or both, is equal to zero. Conversely, if there has been an overflow during the subtraction of the mantissas of floating point words A and B, the FLAG OVERFLOW input signal will be a logical one, causing NAND gate 33 to provide a logical zero output signal, which in turn causes NOR gate 36 to provide a logical one output signal, thus causing multiplexer 41 to select the input signal applied to input terminal 43. At the same time, the output signal from AND gate 34 is a logical one, the output signal from NOR gate 35 is a logical zero, and multiplexer 41 deselects the output signal from inverter 44. Thus, if either word A or B, or both is equal to zero, and if there has been no overflow as a result of the subtraction of the mantissas of floating point words A and B, multiplexer 41 selects from input lead 43 the sign bit of the subtraction of the mantissas in order to provide the $\overline{\text{POSITIVE FLAG}}$ output signal on output lead 42.

Conversely, if either word A or B, or both, is equal to zero, and there has been an overflow as a result of the subtraction of the mantissas of floating point words A and B, multiplexer 41 select from inverter 44 the inverse of the signed bit of the subtraction of the mantissas in order to provide the $\overline{\text{POSITIVE FLAG}}$ output signal on output lead 42.

Table 4 depicts the operation of the circuit of FIG. 3, as previously described.

TABLE 4

| Equal Exponents | Word A or Word B = 0 | Overflow from Subtraction of Mantissas | $\overline{\text{POSITIVE FLAG}}$ |
|---|---|---|---|
| Yes | X | No | $\overline{\text{SIGN BIT}}$ |
| Yes | X | Yes | SIGN BIT |
| No | No | X | Output from NAND 57 |
| No | Yes | No | $\overline{\text{SIGN BIT}}$ |
| No | Yes | Yes | SIGN BIT |

Thus, in accordance with the teachings of this invention, a novel method and structure are provided for performing floating point comparisons. The teachings of this invention are applicable for performing comparisons of floating point numbers and extended floating point numbers, regardless of the width of the bit stream within the microprocessor (e.g., 8-, 16-, 32-bit, etc.) Utilizing the teachings of the present invention, such floating point comparisons can be made at greatly increased speeds as compared with the prior art, and yet require only a minimal amount of additional circuitry. Alternatively, the teachings of this invention can be utilized without any additional hardware, simply by using an appropriate microcode instruction set in a microprocessor.

The specific embodiments of this invention described in this specification are intended to serve by way of example and are not a limitation on the scope of the invention. Numerous other embodiments of this invention will become apparent to those of ordinary skill in the art in light of the teachings of this specification.

We claim:

1. Means for comparing a first and a second floating point number comprising:

first means for providing an exponent difference signal indicating if the exponent of said first floating point number is greater than the exponent of said second floating point number;

second means for providing an equal exponent signal indicating if the exponents of said first and second floating point numbers are equal;

third means for providing a signal indicating if either or both of said first and second floating point numbers are equal to zero; and fourth means for providing an output signal indicating if said first floating point number is greater than said second floating point number, by selecting as said output signal:

the most significant bit of said first floating point number when said exponent of said first floating point number is not greater than said exponent of said second floating point number, and neither of said first or second floating point numbers is equal to zero;

the sign bit resulting from the subtraction of the mantissas when the exponents of said first and second floating point numbers are equal and there has not been an overflow when subtracting said first and second floating point numbers; and the inverse of the sign bit resulting from the subtraction of the mantissas when the exponents of said first and second floating point numbers are equal and there has been an overflow when subtracting said first and second floating point numbers.

* * * * *